United States Patent
Feng et al.

(10) Patent No.: US 9,423,581 B2
(45) Date of Patent: Aug. 23, 2016

(54) PARALLEL OPTICAL SYSTEM WITH INTEGRATED MONITORING PHOTODETECTORS

(71) Applicant: LaXense Inc., Walnut, CA (US)

(72) Inventors: Ningning Feng, Arcadia, CA (US); Xiaochen Sun, Chino Hills, CA (US)

(73) Assignee: LAXENSE INC., Walnut, CA (US)

( * ) Notice: Subject to any disclaimer, the term of this patent is extended or adjusted under 35 U.S.C. 154(b) by 20 days.

(21) Appl. No.: 14/466,762

(22) Filed: Aug. 22, 2014

(65) Prior Publication Data
US 2016/0054530 A1 Feb. 25, 2016

(51) Int. Cl.
*G02B 6/42* (2006.01)
*H04B 10/50* (2013.01)
*H04B 10/2575* (2013.01)
*G02B 6/43* (2006.01)
*G02B 6/12* (2006.01)

(52) U.S. Cl.
CPC ............ *G02B 6/4286* (2013.01); *G02B 6/4204* (2013.01); *G02B 6/4214* (2013.01); *G02B 6/4231* (2013.01); *G02B 6/43* (2013.01); *H04B 10/2575* (2013.01); *H04B 10/501* (2013.01); *G02B 2006/12138* (2013.01)

(58) Field of Classification Search
CPC .. G02B 6/4204; G02B 6/4214; G02B 6/4228; G02B 6/4231; G02B 6/4286; G02B 6/43
USPC .................. 385/14, 33, 36–37, 49, 52, 88–94
See application file for complete search history.

(56) References Cited

U.S. PATENT DOCUMENTS

| | | | |
|---|---|---|---|
| 6,754,406 B2 | 6/2004 | Kaneshiro et al. | |
| 6,953,291 B2 | 10/2005 | Liu | |
| 6,975,784 B1 | 12/2005 | Xu et al. | |
| 6,987,619 B2 * | 1/2006 | Kornrumpf | G02B 3/0075 250/216 |
| 7,178,235 B2 | 2/2007 | Rolston et al. | |
| 7,289,701 B2 | 10/2007 | Lam et al. | |
| 7,371,014 B2 | 5/2008 | Willis et al. | |
| 8,195,017 B2 | 6/2012 | Kaneshiro et al. | |
| 2004/0101020 A1 * | 5/2004 | Bhandarkar | G02B 6/4292 372/109 |

* cited by examiner

*Primary Examiner* — Akm Ullah
*Assistant Examiner* — Michael Mooney
(74) *Attorney, Agent, or Firm* — Chen Yoshimura LLP

(57) ABSTRACT

The invention provides an optical system, in particular, a multi-channel parallel optical transceiver system with monitoring photodetectors and methods of forming the same. The multi-channel parallel optical system includes a substrate with at least one optical component mounted on the first side, at least one optical monitoring photodetector (mPD) fabricated on the first side of the substrate, a set of optical functional components disposed on the first side of the substrate to guide and reflect the light signal, an arrayed fiber placement structure fixing at least one optical fiber and having an exposed end to couple with the optical functional components to guide and diffract light from and to the optical components mounted on the first side of the substrate. The optical alignment of the optical placement structure, optical functional components, and the optical components mounted on the substrate is realized passively through the alignment holes and pins.

10 Claims, 5 Drawing Sheets

PARALLEL OPTICAL SYSTEM WITH INTEGRATED MONITORING PHOTODETECTORS

BACKGROUND OF THE INVENTION

1. Field of the Invention

The invention relates generally to systems and methods of optical micro-assemblies. In particular, the invention relates to passive alignment micro-assembled optoelectronic modules forming multichannel parallel optical systems with optical transmitters, including monitoring photodetectors, and optical receivers.

2. Description of the Related Art

With the ever increasing bandwidth requirement of internet network, datacenters face the challenge of transporting enormous amount of data at high speed. Optical interconnects provide a solution to datacenter builders. Depending on the distance of the data transporting requirements, optical interconnects can adopt different approaches. For short reach requirements, i.e., when the transporting distance is less than about 300 meters, multi-channel parallel optical interconnect systems are usually employed. On the other hand, for long reach systems, i.e., when the transporting distance is from a few hundred meters to a few kilometers, single mode serial optical interconnect systems are employed. This invention is related to short reach parallel optical interconnect systems.

In general, an optical communication system is comprised of an optical transmitter end and an optical receiver end. Particularly for parallel optical system, the optical transmitter or receiver end includes a plurality of light emitting or receiving devices for generating or receiving light signals and encoding or decoding electrical/optical signals, a plurality of light coupling elements (such as lenses, mirrors, gratings) and a plurality of fibers used to carry light signals along a distance. More and more applications require the transmitter end to have optical signal monitoring structures to monitor the working status of the light emitting devices. For short reach optical systems, this is not an easy task to realize because the structure of the light emitting devices, e.g. vertical cavity surface emitting lasers (VCSELs), do not support back side light emitting, which prevents a convenient way to add optical monitors, such as monitoring photodetectors (mPDs). This becomes even more difficult when a much more compact packaging form factor standard QSFP+ is employed for 40G/100G applications due to the already very crowded space arrangement in the package.

SUMMARY OF THE INVENTION

Accordingly, it is desirable to provide a solution to integrate mPDs into QSFP+ 40G/100G modules without significant cost increase.

The present invention is directed to a parallel optical system with integrated monitoring photodetectors and related a fabrication method that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an optical system which includes: a substrate having a first side; a light emitting component mounted on the first side of the substrate for emitting a light signal; an optical monitoring photodetector structure fabricated on the first side of the substrate; an arrayed fiber placement structure for fixing at least one optical fiber and having an exposed end that exposes an end of the at least one optical fiber; and one set of optical functional components disposed between the arrayed fiber placement structure and the first side of the substrate, for directing a part of the light signal emitted by the light emitting component to the exposed end of the arrayed fiber placement structure and directing another part of the light signal emitted by the light emitting component to the optical monitoring photodetector structure.

It is to be understood that both the foregoing general description and the following detailed description are exemplary and explanatory and are intended to provide further explanation of the invention as claimed.

DETAILED DESCRIPTION OF THE PREFERRED EMBODIMENTS

Embodiments of the present invention provide an optical system, in particular, a multi-channel parallel optical transceiver system with monitoring photodetectors, and related methods for forming the same. According to an embodiment of the present invention, a multi-channel parallel optical system includes a substrate with at least one optical component mounted on the first side, at least one optical monitoring photodetector (mPD) fabricated on the first side of the substrate, a set of optical functional components disposed on the first side of the substrate to guide and reflect the light signal, and an arrayed fiber placement structure for fixing at least one optical fiber, the optical fiber having an exposed end exposed by the arrayed fiber placement structure.

Figure 1A:
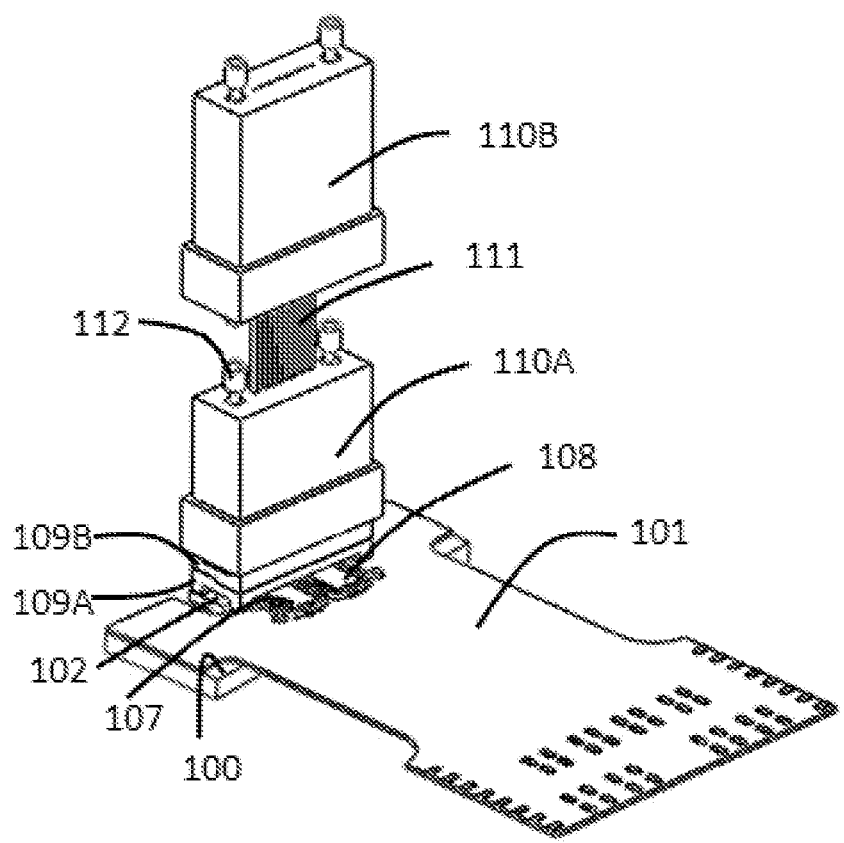
FIG. 1A schematically illustrates an isometric view of an exemplary parallel optical system with monitoring photodetectors according to an embodiment of the present invention.
Figure 1B:
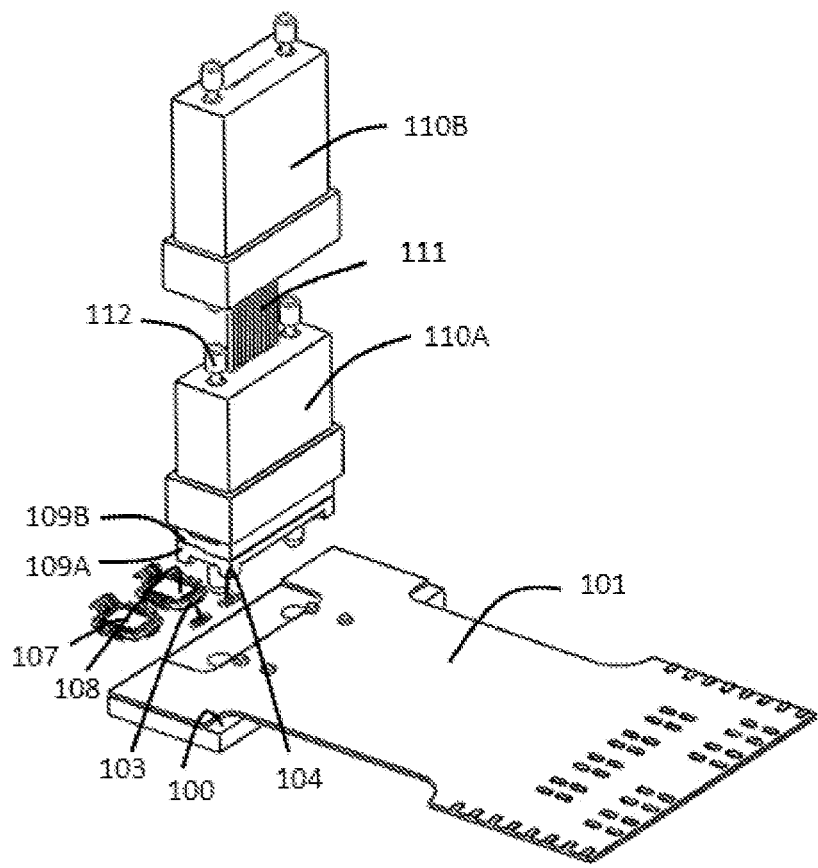
FIG. 1B schematically illustrates an exploded isometric view of the parallel optical system schematically illustrated in FIG. 1A.

An embodiment of the present invention is described with reference to FIGS. 1A-1D. FIG. 1A schematically illustrates an isometric view of an exemplary parallel optical system with mPDs. An exploded isometric view of the optical system depicted in FIG. 1A is illustrated in FIG. 1B.

Figure 1C:
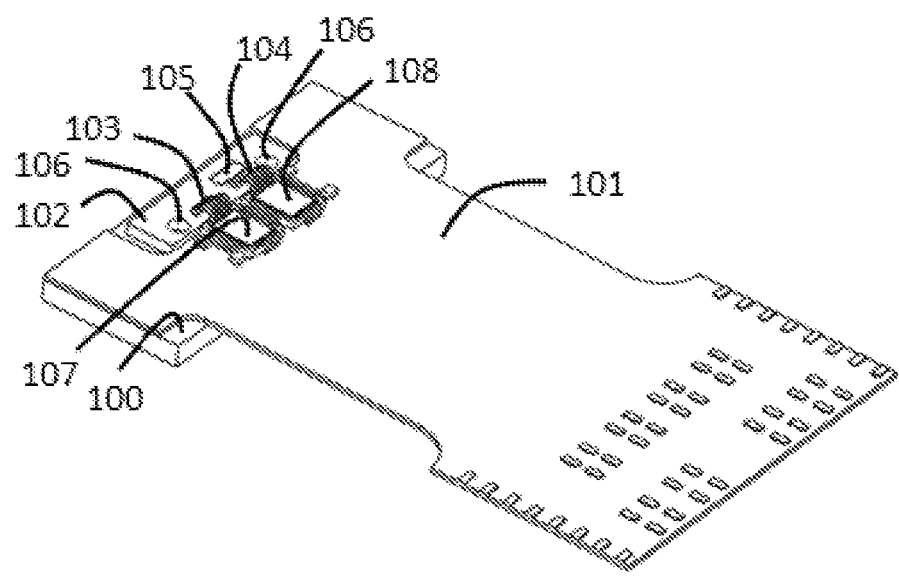
FIG. 1C schematically illustrates an enlarged isometric view of the bottom structure of the parallel optical system schematically illustrated in FIG. 1A.

The optical system includes a substrate 102 mounted on a thermal dispassion plate 100 (e.g. a metal plate) as depicted more detailed in an enlarged isometric view of the bottom structure of the parallel optical system in FIG. 1C. The substrate may be formed of, for example, silicon, glass, or other suitable materials. At least one optical component 103 and/or 104 is mounted on a first side of the substrate 102, which is the side not in contact with the plate 100. In particular, such optical components 103 and/or 104 can be an array of VCSELs and/or surface receiving photodetectors (PDs). At least one mPD 105 is fabricated on the first side of the substrate 102. The mPD may be a light-responsive p-i-n diode or p-n diode including p-doped regions, n-doped regions, and regions sandwiched between the p-doped regions and the n-doped regions. The substrate 102 includes at least one alignment hole 106 to receive an alignment pin of the fiber placement structure 110A.

The substrate 102 has at least one metal layer formed on its first side and electrically connected to the VCSELs and/or PDs mounted on the first side and the mPDs integrated on the first side.

The optical system includes at least one laser driver 107 and/or one trans-impedance amplifier (TIA) 108 disposed on the surface of a flexible high-speed circuit board 101, which is mounted on the surface of the metallic thermal dispassion plate 100, for example by using adhesive material. The laser drivers and/or TIAs is connected with the VCSELs and/or PDs by wires such as gold wires.

The optical system includes an optical coupling structure, which includes an optical fiber placement structure 110A, and a set of optical functional components 109A and 109B to guide and reflect light. The optical functional components 109A and 109B are disposed between the substrate 102 and the optical fiber placement structure 110A. The optical fibers 111 are installed in the fiber placement structure 110A with exposed ends perpendicular to an axis of the optical path of the optical coupling structure. The fiber placement structure 110A, having optical fibers pre-installed in it, is disposed with respect to the first side of the substrate 102 in a way that the exposed ends of the optical fibers are parallel to the first side of the substrate 102 and the optical surfaces of the optical function components 109A and 109B. The optical fibers are optically coupled with the at least one optical component 103/104 in a manner described later. Both optical fiber placement structure 110A and 110B can be standard mechanical transfer (MT) connectors. The optical fibers used in such systems can be multimode or single mode fibers.

Figure 1D:
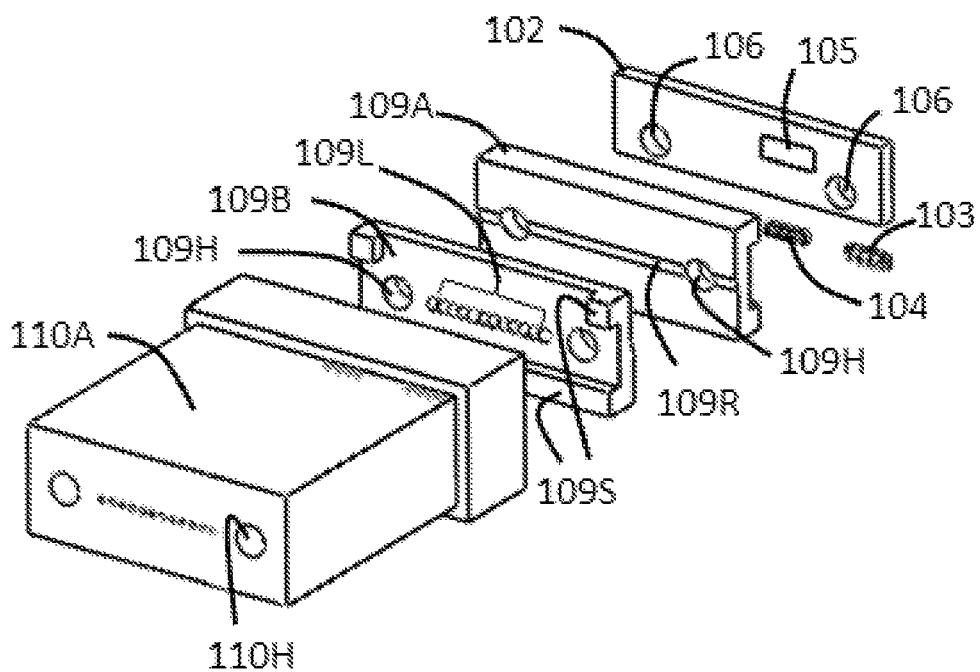
FIG. 1D schematically illustrates an enlarged isometric (rotated) view of the top multichannel optical coupling structure of the parallel optical system schematically illustrated in FIG. 1A.

An enlarged isometric (rotated) view of the top portion of the multichannel optical coupling structure of the optical system is schematically illustrated in FIG. 1D. The multichannel optical coupling structure includes the optical fiber placement structure (MT connector) 110A, one set of optical functional components 109A and 109B, and one set of alignment pins 112 (not shown in FIG. 1D). The optical alignment is realized by using the alignment pins 112 inserted through the alignment holes 110H on the MT connector 110A, 109H on the optical functional components 109A/109B, and 106 on the substrate 102.

The one set of optical functional components comprises two single optical functional components 109A and 109B arranged back to back, wherein each has at least one alignment hole 109H extending through it. On the first side of each of the optical functional components 109A and 109B, i.e. the side that faces away from the other optical functional component, there is an array of microlens 109L fabricated on that surface. Note that in FIG. 1D, only the microlens 109L on the optical functional component 109B are visible. The optical properties of the microlens arrays 109L of each single optical functional component 109A and 109B are not necessarily identical. On the second side of each of the optical functional components 109A and 109B, i.e. the side that face toward the other optical functional component, the surface has a strip shaped slanted optical surface region 109R. The slanted region is non-parallel to the first side of the substrate 102, and non-perpendicular to the optical axis of the optical coupling structure. Preferably, the surface profiles of the second sides of the optical function components 109A and 109B, including the respective strips of slanted regions 109R, mate with each other so the two second sides can be in tight contact with each other. The two microlens arrays 109L and the two strip shaped slanged regions 109R on the optical functional components 109A and 109B all extend in the same direction, referred to as the first transverse direction here. Preferably, viewed in the direction of the optical axis of the optical coupling structure, the centers of the strip shaped slanted regions 109R are aligned with the centers of the microlens arrays 109L. The surface of the slanted surface regions 109R on either or both of the optical functional components 109A or 109B is coated with a partial reflecting film, which partially transmits and partially reflects the light from the light emitting device.

Preferably, spacer structures 109S are respectively provided on the first sides of the optical functional components 109A and 109B to control the distances between the optical surfaces (e.g. the surfaces of the microlens 109L) of the optical functional component 109A and the optical components 103 and/or 104 mounted on the substrate 102, and the distance between the optical surfaces (e.g. the surfaces of the microlens 109L) of the optical functional component 109B and the exposed end of the optical fibers installed in the optical fiber placement structure 110A.

Figure 2:
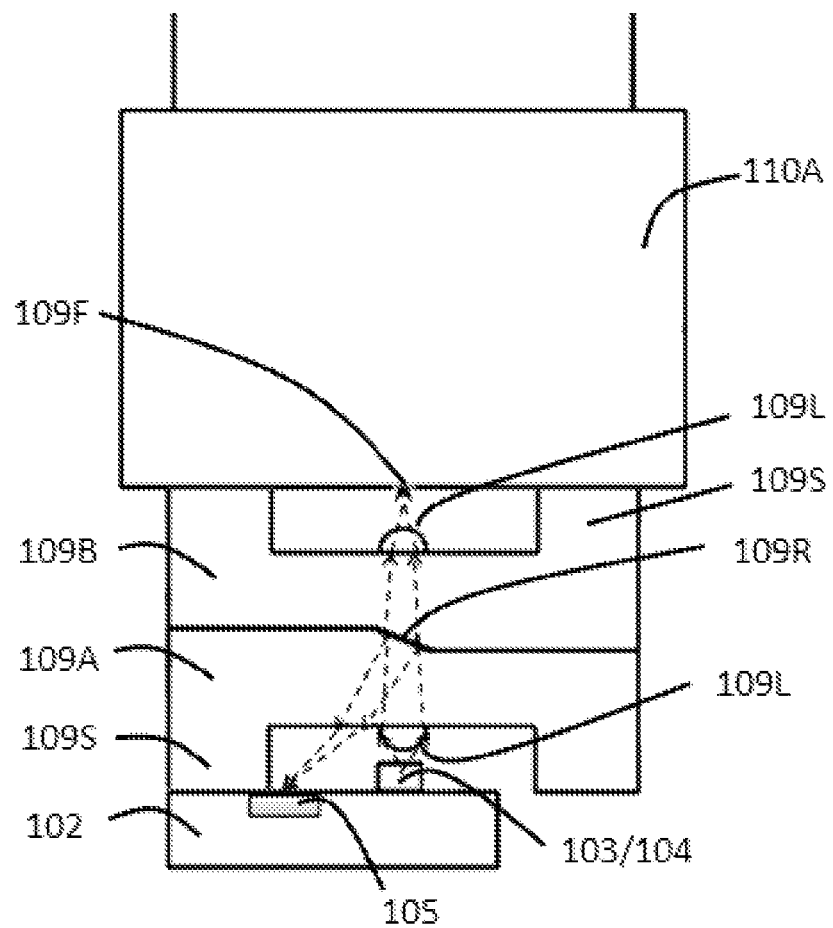
FIG. 2 schematically illustrates the optical path and working principle of the parallel optical system with monitoring photodetectors schematically illustrated in FIG. 1A.

The working principle of the multichannel parallel optical system is explained with reference to FIG. 2, which is a cross-sectional view taken in a plane parallel to the optical axis and perpendicular to the first transverse direction. When the optical coupling structure is the transmitting end, the light emitted from the VCSEL 103 passes through the microlens array 109L of the optical functional component 109A. When the light is incident on the coated surface of the slanted surface region 109R on the second side of either the first or the second optical functional component 109A or 109B (the one that is coated with the partial reflecting film), it is partially reflected back by the film toward the first side of the optical functional component 109A. The light is refracted when existing the first side and is received by the mPD array 105 fabricated the first side of the substrate 102 to realize an optical monitoring functionality. Meanwhile, the light partially transmitted through the slanted surface strip 109R continues to transmit through the second optical functional component 109B which is arranged back to back with the first optical functional component 109A. The light is incident on the microlens array 109L on the first side of the second optical function component 109B and is focused onto the exposed ends 109F of the optical fibers installed in the fiber placement structure 110A.

When the optical coupling structure is the receiving end, the light travels in the reverse direction, except that the strips of slanted surface regions 109R on the receiver end are not coated with the partial reflecting film, so that the light coming from the optical fibers passes through the slanted surface regions without any reflection.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:
1. An optical system comprising:
a substrate having a first side;

a light emitting component mounted on the first side of the substrate for emitting a light signal;

an optical monitoring photodetector structure disposed on the first side of the substrate;

an arrayed fiber placement structure for fixing at least one optical fiber and having an exposed end that exposes an end of the at least one optical fiber; and one set of optical functional components disposed between the arrayed fiber placement structure and the first side of the substrate, for directing a part of the light signal emitted by the light emitting component to the exposed end of the arrayed fiber placement structure and directing another part of the light signal emitted by the light emitting component to the optical monitoring photodetector structure, wherein the one set of optical functional components comprises two single optical functional components arranged back to back, wherein a second side of each of the two single optical functional components includes a slanted surface region, and wherein the slanted surface regions of the two single optical functional components are in tight contact with each other and are disposed on an optical path of the light signal.

2. The optical system of claim 1, wherein each of the two single optical functional components has at least one alignment hole extending through it.

3. The optical system of claim 1, wherein the substrate has at least one alignment hole extending into it from its first side, wherein the arrayed fiber placement structure has at least one alignment pin placed through it, the at least one alignment pin being inserted into the at least one alignment holes of the one set of optical functional components and the at least one alignment hole of the substrate.

4. The optical system of claim 1, wherein the slanted surface regions of the two single optical functional components that are in tight contact with each other form an optical surface to partially reflect the light signal back to the optical monitoring photodetector and partially transmit the light signal to the exposed end of the arrayed fiber placement structure.

5. The optical system of claim 1, wherein the optical monitoring photodetector includes a light-responsive p-i-n diode or p-n diode including p-doped regions, n-doped regions, and regions sandwiched between the p-doped regions and the n-doped regions.

6. The optical system of claim 1, wherein the substrate has at least one metal layer formed on its first side and electrically connected to the light emitting element mounted on its first side and the at least one optical monitoring photodetector integrated on its first side.

7. The optical system of claim 2, wherein each one of the single optical functional components has a first side integrated with at least one optical microlens and wherein the slanted surface region of the second side of each one of the optical functional components is aligned with a center of the at least one optical microlens on the respective first side.

8. The optical system of claim 7, wherein the slanted surface region on the second side of one of the single optical functional component has an optically smooth surface coated with a partial reflecting film.

9. The optical system of claim 7, wherein each one of the single optical functional components has spacer structures on the first side.

10. The optical system of claim 1, wherein the light emitting component includes an array of light emitting devices, wherein the optical monitoring photodetector structure includes an array of optical monitoring photodetectors, wherein the at least one optical fiber includes an array of optical fibers.

* * * * *